(12) United States Patent
Chien et al.

(10) Patent No.: US 11,126,233 B2
(45) Date of Patent: Sep. 21, 2021

(54) INTERFACE BRIDGE CIRCUIT CAPABLE OF REDUCING HEAT GENERATION

(71) Applicant: Realtek Semiconductor Corp., Hsinchu (TW)

(72) Inventors: Yi Ting Chien, Hsinchu (TW); Cheng Yuan Hsiao, Hsinchu (TW); Chih Yu Hsu, Hsinchu (TW); Sung Kao Liu, Hsinchu (TW); Wei Hung Chuang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/929,202

(22) Filed: Jul. 15, 2020

(65) Prior Publication Data

US 2021/0048859 A1 Feb. 18, 2021

(30) Foreign Application Priority Data

Aug. 13, 2019 (TW) .................. 108128694

(51) Int. Cl.
*G06F 1/00* (2006.01)
*G06F 1/20* (2006.01)
*G06F 1/3206* (2019.01)

(52) U.S. Cl.
CPC ............ *G06F 1/206* (2013.01); *G06F 1/3206* (2013.01)

(58) Field of Classification Search
CPC ....... G06F 1/206; G06F 1/3206; G06F 1/3253
See application file for complete search history.

(56) References Cited

U.S. PATENT DOCUMENTS

| 6,622,186 B1* | 9/2003 | Moniot ................ G06F 12/023 710/1 |
| 2008/0065796 A1 | 3/2008 | Lee et al. |
| 2010/0023678 A1* | 1/2010 | Nakanishi ............... G06F 1/206 711/103 |

* cited by examiner

*Primary Examiner* — Nitin C Patel
(74) *Attorney, Agent, or Firm* — McClure, Qualey & Rodack, LLP

(57) ABSTRACT

A circuit includes: a first interface circuit supporting multiple first interface operating modes respectively corresponding to different versions of a first data transmission protocol; a second interface circuit supporting multiple second interface operating modes respectively corresponding to different versions of a second data transmission protocol; a control circuit configured to operably instruct the first interface circuit to operate in a first target operating mode selected from the multiple first interface operating modes, and configured to operably instruct the second interface circuit to operate in a second target operating mode selected from the multiple second interface operating modes; wherein a difference between a nominal data rate of the first target operating mode and a nominal data rate of the second target operating mode is less than a predetermined threshold.

8 Claims, 3 Drawing Sheets

INTERFACE BRIDGE CIRCUIT CAPABLE OF REDUCING HEAT GENERATION

CROSS-REFERENCE TO RELATED APPLICATIONS

This application claims the benefit of priority to Patent Application No. 108128694, filed in Taiwan on Aug. 13, 2019; the entirety of which is incorporated herein by reference for all purposes.

BACKGROUND

The disclosure generally relates to an interface bridge circuit and, more particularly, to an interface bridge circuit capable of reducing heat generation.

When there is no identical or compatible data transmission interface between different electronic devices, an additional interface bridge circuit is needed as a data transmission medium between those electronic devices. As technology progresses, the interface circuit of the interface bridge circuit is able to support a higher data transmission rate, thereby generating more waste heat during the operation of the interface bridge circuit.

On the other hand, in order to make it convenient for carrying around, interface bridge circuits are designed to be more and more miniature, thus the sizes and volumes of the interface bridge circuits have become smaller and smaller. Hence, it presents difficulties for attaching a heat dissipation device onto the interface bridge circuit for dissipating those waste heats. In the case that the generated heat from the interface bridge circuit cannot be effectively reduced, the internal components of the interface bridge circuit can suffer additional thermal stress, resulting in the internal components of the interface bridge circuit being more easily damaged and the product lifespan of the interface bridge circuit being shortened.

SUMMARY

An example embodiment of an interface bridge circuit is disclosed, comprising: a circuit configured to operably communicate with a first device by adopting a first data transmission protocol and configured to operably support multiple first interface operation modes respectively corresponding to different versions of the first data transmission protocol; a second interface circuit configured to operably communicate with a second device by adopting a second data transmission protocol different from the first data transmission protocol and configured to operably support multiple second interface operation modes respectively corresponding to different versions of the second data transmission protocol; and a control circuit that is coupled with the first interface circuit and the second interface circuit, that is configured to operably instruct the first interface circuit to operate in a first target operation mode selected from the multiple first interface operation modes when a predetermined condition is satisfied, and that is configured to operably instruct the second interface circuit to operate in a second target operation mode selected from the multiple second interface operation modes when the predetermined condition is satisfied; wherein a difference between a nominal data rate of the first target operation mode and a nominal data rate of the second target operation mode is less than a predetermined threshold.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
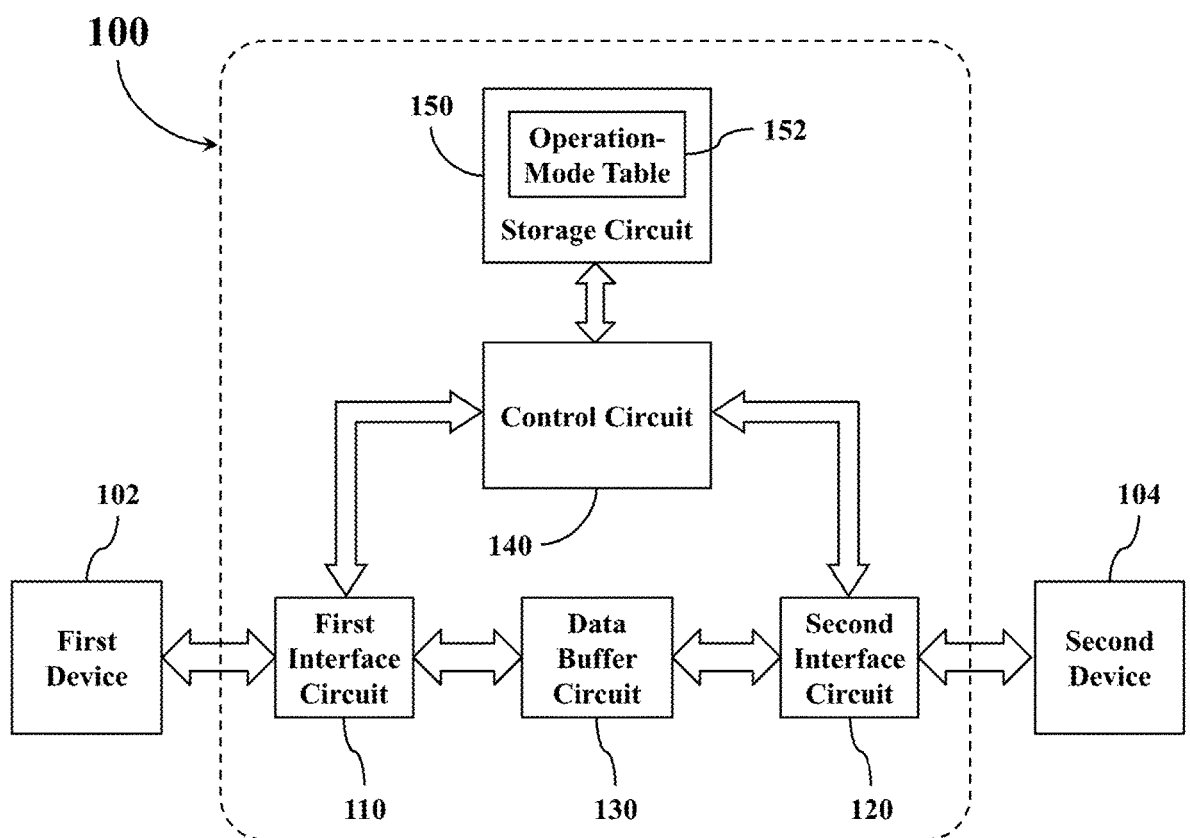
FIG. 1 shows a simplified functional block diagram of an interface bridge circuit according to a first embodiment of the present disclosure.

FIG. 1 shows a simplified functional block diagram of an interface bridge circuit 100 according to a first embodiment of the present disclosure. The interface bridge circuit 100 is utilized or in actual application to be coupled between a first device 102 and a second device 104, serving as a data transmission medium between the first device 102 and the second device 104.

In the embodiment of FIG. 1, the interface bridge circuit 100 includes a first interface circuit 110, a second interface circuit 120, a data buffer circuit 130, a control circuit 140, and a storage circuit 150.

The first interface circuit 110 is configured to operably communicate with a first device 102 by adopting a first data transmission protocol, and to operably support multiple first interface operation modes respectively corresponding to different versions of the first data transmission protocol.

The second interface circuit 120 is configured to operably communicate with a second device 104 by adopting a second data transmission protocol, and to operably support multiple second interface operation modes respectively corresponding to different versions of the second data transmission protocol, the second data transmission protocol being different from the first data transmission protocol.

The data buffer circuit 130 is coupled between the first interface circuit 110 and the second interface circuit 120. The data buffer circuit 130 is configured to operably store data to be converted into different formats between the first interface circuit 110 and the second interface circuit 120.

The control circuit 140 is coupled with the first interface circuit 110 and the second interface circuit 120. The control circuit 140 is configured to operably control respective operation modes of the first interface circuit 110 and the second interface circuit 120 according to a data transmission rate relationship among the first device 102, the second device 104, the first interface circuit 110, and the second interface circuit 120.

The storage circuit 150 is coupled with the control circuit 140, and configured to operably store an operation-mode table 152. The operation-mode table 152 contains records of multiple first interface operation modes supported by the first interface circuit 110, multiple second interface operation modes supported by the second interface circuit 120, and the nominal data rates of respective operation modes thereof.

In actual applications, each of the aforementioned first device 102 and second device 104 may be various electronic devices having computing capability, command interpreting capability, and capable of supporting specific data transmission protocol. Such examples are a desktop computer, a notebook computer, a tablet computer, a mobile communication device (e.g., a smart phone), a wearable device, or other similar devices. Alternatively, either the aforementioned first device 102 or second device 104 may instead be a computer peripheral device that only supports specific data transmission protocol, but does not possess advanced computing and command processing capabilities. Such examples are various types of external disk drive box, external disk drive cards, or other similar devices.

In some embodiments, the first device 102 and the second device 104 may conduct bi-directional communications with each other through the interface bridge circuit 100. In other embodiments, the first device 102 may simply conduct a unidirectional data transmission to the second device 104 through the interface bridge circuit 100, or vice versa.

In the interface bridge circuit 100, each of the first interface circuit 110 and the second interface circuit 120 may be realized with a transmission circuit compatible with various SATA (Serial Advanced Technology Attachment) series transmission standards, PCIe (Peripheral Component Interconnect Express) series transmission standards, USB (Universal Serial Bus) series transmission standards, Bluetooth or BLE (Bluetooth Low Energy) series transmission standards, and/or IEEE 802.11 series wireless communication standards etc. As described previously, however, the data transmission protocols supported by the first interface circuit 110 and the second interface circuit 120 are different with each other.

For example, the first interface circuit 110 may be realized with a transmission circuit supporting the SATA series transmission standards, while the second interface circuit 120 may be realized with a transmission circuit supporting the PCIe series transmission standards. For another example, the first interface circuit 110 may be realized with a transmission circuit supporting the PCIe series transmission standards, while the second interface circuit 120 may be realized with a transmission circuit supporting the USB series transmission standards. For yet another example, the first interface circuit 110 may be realized with a transmission circuit supporting the SATA series transmission standards, while the second interface circuit 120 may be realized with a transmission circuit supporting the USB series transmission standards. For yet another example, the first interface circuit 110 may be realized with a transmission circuit supporting the USB series transmission standards, while the second interface circuit 120 may be realized with a transmission circuit supporting the IEEE 802.11 series transmission standards. For yet another example, the first interface circuit 110 may be realized with a transmission circuit supporting the Bluetooth series transmission standards, while the second interface circuit 120 may be realized with a transmission circuit supporting the USB series transmission standards. For yet another example, the first interface circuit 110 may be realized with a transmission circuit supporting the PCIe series transmission standards, while the second interface circuit 120 may be realized with a transmission circuit supporting the IEEE 802.11 series transmission standards.

The data buffer circuit 130 may be realized with various volatile storage circuits or non-volatile storage circuits capable of temporarily storing data, such as various DRAM (dynamic random-access memories), SDRAM (synchronous dynamic random-access memories), flash memories, or the like.

The control circuit 140 may be realized with various microprocessor units or microprocessor modules having computing and command processing capabilities, or may be realized with an ASIC (application-specific integrated circuit) having those capabilities.

The storage circuit 150 may be realized with various non-volatile storage circuits capable of storing data, such as various EPROM (erasable programmable read only memories), EEPROM (electrically-erasable programmable read-only memories), flash memories, or the like.

In addition, different functional blocks in the aforementioned interface bridge circuit 100 may be realized with separate circuits, or may be integrated into a single circuit chip. For example, all of the functional blocks in the interface bridge circuit 100 may be integrated into a single interface bridge chip. Alternatively, the interface bridge circuit 100 may be integrated into either the first device 102 or the second device 104.

Figure 2:
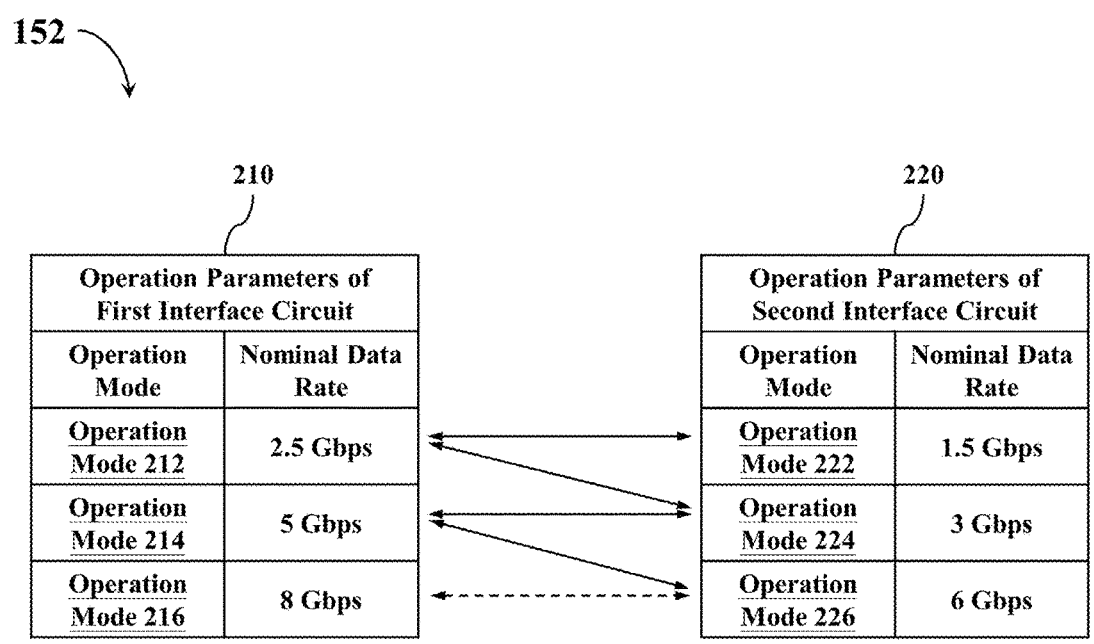
FIG. 2 shows a simplified schematic diagram of an operation-mode table according to one embodiment of the present disclosure.

Please refer to FIG. 2, which shows a simplified schematic diagram of an operation-mode table 152 according to one embodiment of the present disclosure. As shown in FIG. 2, the operation-mode table 152 includes a first data section 210 and a second data section 220. The first data section 210 is utilized to record multiple first interface operation modes that can be supported by the first interface circuit 110. The second data section 220 is utilized to record multiple second interface operation modes that can be supported by the second interface circuit 120.

As described previously, the multiple first interface operation modes recorded in the first data section 210 respectively correspond to different versions of the first data transmission protocol supported by the first interface circuit 110, while the multiple second interface operation modes recorded in the second data section 220 respectively correspond to different versions of the second data transmission protocol supported by the second interface circuit 120.

In general, different versions of the same data transmission protocol have different nominal data rates, that is, the theoretical maximum data transmission rate.

For example, in the embodiment of FIG. 2, the first data section 210 has a record of three candidate operation modes 212, 214, and 216 that can be supported by the first interface circuit 110, the three candidate operation modes 212, 214, and 216 respectively corresponding to three versions of the first data transmission protocol. The nominal data rates of the three candidate operation modes 212, 214, and 216 respectively are 2.5 Gbps, 5 Gbps, and 8 Gbps. The second data section 220 has a record of three candidate operation modes 222, 224, and 226 supported by the second interface circuit 120, the three candidate operation modes 222, 224, and 226 respectively corresponding to three versions of the second data transmission protocol. The nominal data rates of the three candidate operation modes 222, 224, and 226 respectively are 1.5 Gbps, 3 Gbps, and 6 Gbps.

In other words, in the embodiment of FIG. 2, the maximum data rate can be supported by the first interface circuit 110 is 8 Gbps, and the maximum data rate can be supported by the second interface circuit 120 is 6 Gbps. That is, the maximum data rate supported by the first interface circuit 110 is higher than the maximum data rate supported by the second interface circuit 120 in this embodiment.

In a conventional interface bridge circuit, each interface circuit operates in an operation mode having its maximum nominal data rate to improve the data transmission performance, but this approach can generate a large amount of heat. As a result, it would increase the likelihood that the internal electronic components in such conventional interface bridge circuit being damaged by the thermal stress, thereby shortening the product lifespan of the internal electronic components.

However, unlike the conventional interface bridge circuit, the control circuit 140 in the aforementioned interface bridge circuit 100 flexibly configures the operation modes of the first interface circuit 110 and the second interface circuit 120 according to the relationship among the data transmission rates supported by the first device 102, the data transmission rates supported by the second device 104, the data transmission rates supported by the first interface circuit 110, and the data transmission rates supported by the second interface circuit 120.

In the beginning of the operation, the control circuit 140 may conduct an initial communication with the first device 102 through the first interface circuit 110 to acquire the related data transmission parameters of the first device 102, so as to obtain the maximum transmission rate supported by the first device 102. Similarly, the control circuit 140 may conduct an initial communication with the second device 104 through the second interface circuit 120 to acquire the related data transmission parameters of the second device 104, so as to obtain the maximum transmission rate supported by the second device 104.

After the control circuit 140 obtains the maximum transmission rate of the first device 102 and the maximum transmission rate of the second device 104, the control circuit 140 may, according to the contents of the operation-mode table 152, select a first target operation mode out of multiple first interface operation modes to be the operation mode of the first interface circuit 110, and may, according to the contents of the operation-mode table 152, select a second target operation mode out of multiple second interface operation modes to be the operation mode of the second interface circuit 120, so that the difference between the nominal data rate of the first target operation mode and the nominal data rate of the second target operation mode can be smaller than a predetermined threshold.

In the case that the maximum data transmission rates of the first device 102 and the second device 104 are both higher than the maximum data rate supported by the second interface circuit 120, and the interface bridge circuit 100 selects a speed as priority approach for its operation strategy at that time, the control circuit 140 may instruct the first interface circuit 110 and the second interface circuit 120 to respectively operate in their maximum speed modes similar to the conventional approach. In this embodiment, for example, the control circuit 140 may instruct the first interface circuit 110 to operate in the operation mode 216, and instruct the second interface circuit 120 to operate in the operation mode 226. In this situation, the maximum data transmission rate between the first interface circuit 110 and the first device 102 would be 8 Gbps, and the maximum data transmission rate between the second interface circuit 120 and the second device 104 would be 6 Gbps. Therefore, the data transmission efficiency between the first device 102 and the second device 104 can be maximized.

In the case that the maximum data transmission rates of the first device 102 and the second device 104 are both higher than the maximum data rate supported by the second interface circuit 120, and the interface bridge circuit 100 selects a balanced approach as its operation preference at that time, then the control circuit 140 may first search the contents of the operation-mode table 152 to select a candidate operation mode having the highest nominal data rate (i.e., the operation mode 226 in this embodiment) from the second data section 220 to be the second target operation mode for use in the second interface circuit 120. Then, the control circuit 140 may search the contents of the operation-mode table 152 again to select a candidate operation mode from the first data section 210 to be the first target operation mode for use in the first interface circuit 110, such that the difference between the nominal data rate of the first target operation mode and the nominal data rate of the second target operation mode is smaller than the aforementioned predetermined threshold. For example, if the aforementioned predetermined threshold is 2.2 Gbps, then the control circuit 140 may select the candidate operation modes 214 or 216 from the first data section 210 to be the aforementioned first target operation mode, because the difference between the nominal data rate of the candidate operation modes 214 or 216 and the nominal data rate of the operation mode 226 is smaller than 2.2 Gbps. For another example, if the aforementioned predetermined threshold is 1.5 Gbps, then the control circuit 140 may select the candidate operation modes 214 from the first data section 210 to be the aforementioned first target operation mode, because the difference between the nominal data rate of the candidate operation mode 214 and the nominal data rate of the candidate operation mode 226 is smaller than 1.5 Gbps.

In the case that the maximum data transmission rate of the first device 102 is lower than the maximum data rate supported by the second interface circuit 120, but the maximum data transmission rate of the second device 104 is higher than the maximum data rate supported by the second interface circuit 120, then the control circuit 140 may first search the contents of the operation-mode table 152, and select a candidate operation mode, whose nominal data rate is the closest to the maximum data transmission rate of the first device 102, from the first data section 210 to be the first target operation mode for use in the first interface circuit 110. If the first target operation mode selected from the first data section 210 by the control circuit 140 is the candidate operation mode 214, then the control circuit 140 may search the contents of the operation-mode table 152 to select a candidate operation mode from the second data section 220 to be the second target operation mode for use in the second interface circuit 120, such that the difference between the nominal data rate of the second target operation mode and the nominal data rate of the first target operation mode (i.e., the operation mode 214 in this embodiment) is smaller than the aforementioned predetermined threshold. For example, if the aforementioned predetermined threshold is 2.5 Gbps, then the control circuit 140 may select the candidate operation mode 224 or 226 from the second data section 220 according to the operation strategy of the interface bridge circuit 100 to be the aforementioned first target operation mode, because the difference between the nominal data rate of the candidate operation mode 224 or 226 and the nominal data rate of the candidate operation mode 214 is smaller than 2.5 Gbps. For another example, if the aforementioned predetermined threshold is 1.5 Gbps, then the control circuit 140 may select the candidate operation mode 226 from the second data section 220 to be the aforementioned second target operation mode, because the difference between the nominal data rate of the candidate operation mode 226 and the nominal data rate of the candidate operation mode 214 is smaller than 1.5 Gbps.

In the case that the maximum data transmission rate of the first device 102 is higher than the maximum data rate supported by the second interface circuit 120, but the maximum data transmission rate of the second device 104 is lower than the maximum data rate supported by the second interface circuit 120, then the control circuit 140 may first search the contents of the operation-mode table 152 to select a candidate operation mode, whose nominal rate is the closest to the maximum data transmission rate of the second device 104, from the second data section 220 to be the second target operation mode for use in the second interface circuit 120. If the second target operation mode selected from the second data section 220 by the control circuit 140 is the candidate operation mode 224, then the control circuit 140 may search the contents of the operation-mode table 152 to select a candidate operation mode from the first data section 210 to be the first target operation mode for use in the first interface circuit 110, such that the difference between the nominal data rate of the first target operation mode and the nominal data rate of the second target operation mode (i.e., the operation mode 224 in this embodiment) is smaller than the aforementioned predetermined threshold. For example, if the aforementioned predetermined threshold is 2.4 Gbps, then the control circuit 140 may select the candidate operation mode 212 or 214 from the first data section 210 according to the operation strategy of the interface bridge circuit 100 to be the aforementioned first target operation mode, because the difference between the nominal data rate of the candidate operation mode 212 or 214 and the nominal data rate of the candidate operation mode 224 is smaller than 2.4 Gbps. For another example, if the aforementioned predetermined threshold is 1.2 Gbps, then the control circuit 140 may select the candidate operation mode 212 from the first data section 210 to be the aforementioned first target operation mode, because the difference between the nominal data rate of the candidate operation mode 212 and the nominal data rate of the candidate operation mode 224 is smaller than 1.2 Gbps.

In the case that the maximum data transmission rates of the first device 102 and the second device 104 are both lower than the maximum data rate supported by the second interface circuit 120, and the maximum data transmission rate of the first device 102 is lower than the maximum data transmission rate of the second device 104, then the control circuit 140 may first search the contents of the operation-mode table 152 to select a candidate operation mode, whose nominal data rate is the closest to the maximum data transmission rate of the first device 102, from the first data section 210 to be the first target operation mode for use in the first interface circuit 110. If the first target operation mode selected from the first data section 210 by the control circuit 140 is the candidate operation mode 212, then the control circuit 140 may search the contents of the operation-mode table 152 to select a candidate operation mode from the second data section 220 to be the second target operation mode for use in the second interface circuit 120, such that the difference between the nominal data rate of the second target operation mode and the nominal data rate of the first target operation mode (i.e., the operation mode 212 in this embodiment) is smaller than the aforementioned predetermined threshold. For example, if the aforementioned predetermined threshold is 2.2 Gbps, then the control circuit 140 may select the candidate operation mode 222 or 224 from the second data section 220 to be the aforementioned first target operation mode according to the operation strategy of the interface bridge circuit 100, because the difference between the nominal data rate of the operation mode 222 or 224 and the nominal data rate of the candidate operation mode 212 is smaller than 2.2 Gbps. For another example, if the aforementioned predetermined threshold is 0.8 Gbps, then the control circuit 140 may select the candidate operation mode 224 from the second data section 220 to be the aforementioned second target operation mode, because the difference between the nominal data rate of the candidate operation mode 224 and the nominal data rate of the candidate operation mode 212 is smaller than 0.8 Gbps.

In the case that the maximum data transmission rates of the first device 102 and the second device 104 are both lower than the maximum data rate supported by the second interface circuit 120, and the maximum data transmission rate of the first device 102 is higher than the maximum data transmission rate of the second device 104, then the control circuit 140 may first search the contents of the operation-mode table 152 to select a candidate operation mode, whose nominal data rate is the closest to the maximum data transmission rate of the second device 104, from the second data section 220 to be the second target operation mode for use in the second interface circuit 120. If the second target operation mode selected from the second data section 220 by the control circuit 140 is the candidate operation mode 222, then the control circuit 140 may search the contents of the operation-mode table 152 to select a candidate operation mode from the first data section 210 to be the first target operation mode for use in the first interface circuit 110, such that the difference between the nominal data rate of the first target operation mode and the nominal data rate of the second target operation mode (i.e., the operation mode 222 in this embodiment) is smaller than the aforementioned predetermined threshold. For example, if the aforementioned predetermined threshold is 3.7 Gbps, then the control circuit 140 may select the candidate operation mode 212 or 214 from the first data section 210 to be the aforementioned first target operation mode according to the operation strategy of the interface bridge circuit 100, because the difference between the nominal data rate of the candidate operation mode 212 or 214 and the nominal data rate of the candidate operation mode 222 is smaller than 3.7 Gbps. For another example, if the aforementioned predetermined threshold is 1.5 Gbps, then the control circuit 140 may select the candidate operation mode 212 from the first data section 210 to be the aforementioned first target operation mode, because the difference between the nominal data rate of the candidate operation mode 212 and the nominal data rate of the operation mode 222 is smaller than 1.5 Gbps.

After the aforementioned first target operation mode and second target operation mode are selected, the control circuit 140 then instructs the first interface circuit 110 to operate in the first target operation mode, so as to communicate with the first device 102. On the other hand, the control circuit 140 also instructs the second interface circuit 120 to operate in the second target operation mode, so as to communicate with the second device 104.

As can be appreciated from the foregoing descriptions, when the maximum data transmission rate of either the first device 102 or the second device 104 is lower than the maximum data rate supported by the second interface circuit 120, the first target operation mode or the second target operation mode selected by the control circuit 140 may not be the fastest operation mode supported by the corresponding interface circuit. In this situation, the data transmission efficiency between the first device 102 and the second device 104 may not be maximized.

However, the aforementioned approach that the control circuit 140 purposely instructs the first interface circuit 110 and the second interface circuit 120 to operate in an operation mode close to the nominal data rate, can effectively reduce the heat generation of the first interface circuit 110 and/or the second interface circuit 120, and thus decrease the opportunity of that the internal components of the first interface circuit 110 and/or the second interface circuit 120 are damaged by suffering the thermal stress, thereby increasing the durability of the first interface circuit 110 and/or the second interface circuit 120.

As a result, it not only increases the durability of the interface bridge circuit 100, but also reduces the power consumption during the operation of the interface bridge circuit 100. Therefore, if the aforementioned first device 102 and the second device 104 are realized with battery-powered devices, then the controlling approach with respect to the first interface circuit 110 and the second interface circuit 120 adopted by the aforementioned control circuit 140 can also achieve the merit of extended operation time or the standby time of both the first device 102 and the second device 104.

Figure 3:
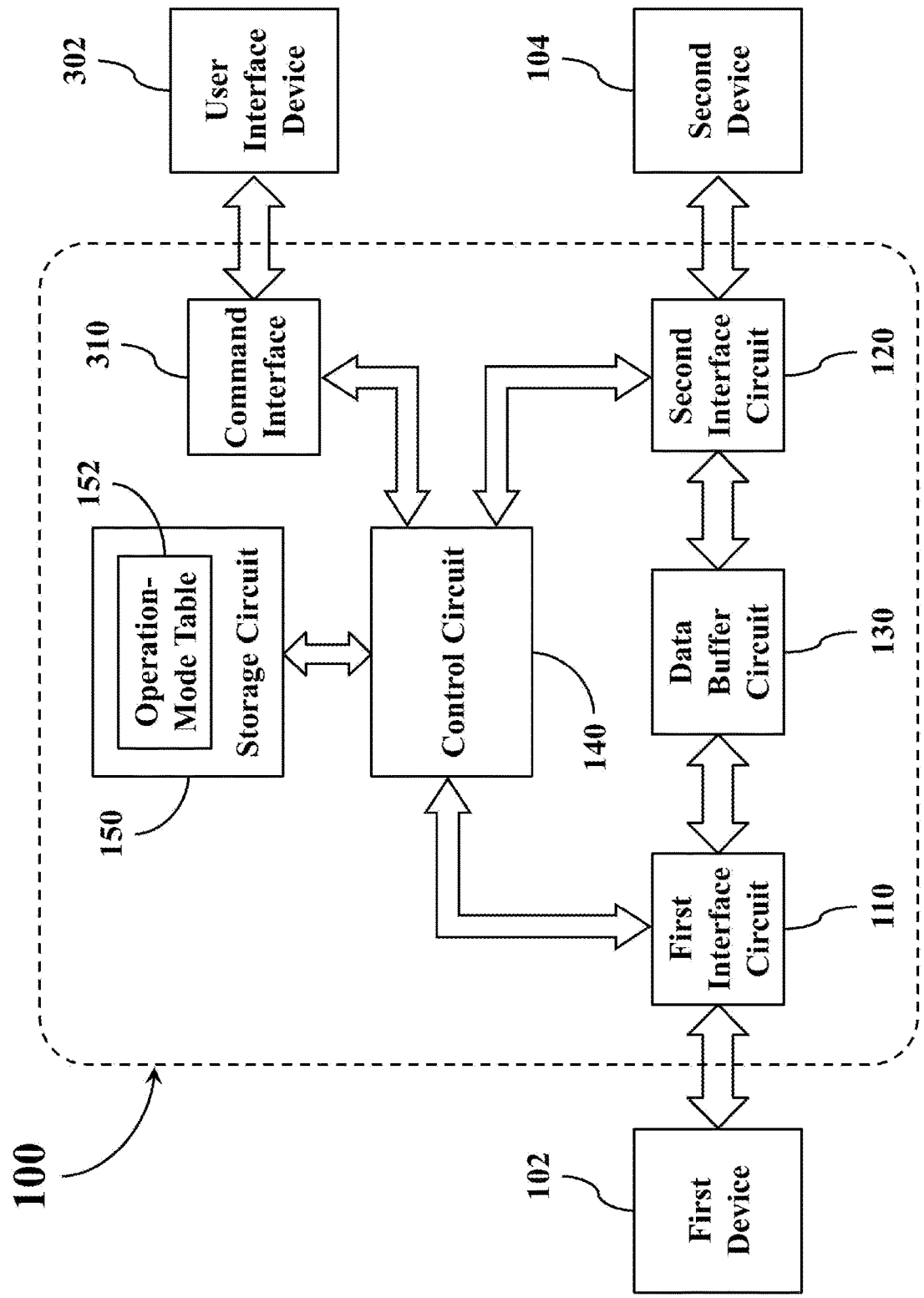
FIG. 3 shows a simplified functional block diagram of an interface bridge circuit according to a second embodiment of the present disclosure.

FIG. 3 shows a simplified functional block diagram of the interface bridge circuit 100 according to a second embodiment of the present disclosure. In the embodiment of FIG. 3, the interface bridge circuit 100 further includes a command interface 310. The command interface 310 is coupled with the control circuit 140, and utilized for coupling with a user interface device 302.

In practice, the user interface device 302 may be realized with various devices that allow a user to input setting commands, such as a button, a switch, a keyboard, a touching panel, a voice control device, or the like. The command interface 310 may be realized with various input and output interface circuits capable of receiving related setting commands from the user interface device 302.

As can be appreciated from the foregoing descriptions, in some situations described above, the control circuit 140 may select an appropriate operation mode from the first data section 210 to be the aforementioned first target operation mode according to the operation strategy of the interface bridge circuit 100, or may select an appropriate operation mode from the second data section 220 to be the aforementioned second target operation mode according to the operation strategy of the interface bridge circuit 100. The interface bridge circuit 100 in the embodiment of FIG. 3 allows the user to flexibly configure the operation mode of the interface bridge circuit 100.

Specifically, the user may manipulate the user interface device 302 to issue a mode setting command, or may issue instructions to the user interface device 302 by using voice control approach, so that the user interface device 302 generates a corresponding mode setting command. In this situation, the command interface 310 transmits the mode setting command generated by the user interface device 302 to the control circuit 140, and the control circuit 140 adjusts the method of selecting the candidate operation mode from the first data section 210 or the second data section 220 according to the mode setting command issued from the user.

For example, in the case that the control circuit 140 needs to select one candidate operation mode from the multiple candidate operation modes recorded in the first data section 210 to be the first target operation mode, such that the difference between the nominal data rate of the selected candidate operation mode and the nominal data rate of the second target operation mode can be smaller than the predetermined threshold. In this situation, if the aforementioned mode setting command requests the interface bridge circuit 100 to adopt the speed as priority approach as its operation strategy, then the control circuit 140 may select a candidate operation mode having the highest nominal data rate from multiple candidate operation modes matching the conditions to be the first target operation mode.

If the aforementioned mode setting command requests the interface bridge circuit 100 to select the balanced approach as its operation preference, then the control circuit 140 may select a candidate operation mode from multiple operation modes matching the conditions to be the first target operation mode, such that the difference between the nominal data rate of the first target operation mode and the nominal data rate of the second target operation mode can be minimized.

If the aforementioned mode setting command requests the interface bridge circuit 100 to adopt a power saving approach as its operation strategy, then the control circuit 140 may select a candidate operation mode having the lowest nominal data rate from multiple candidate operation modes matching the conditions to be the first target operation mode.

For another example, in the case that the control circuit 140 needs to select one candidate operation mode from the multiple candidate operation mode recorded in the second data section 220 to be the second target operation mode, such that the difference between the nominal data rate of the selected candidate operation mode and the nominal data rate of the first target operation mode can be smaller than the predetermined threshold. In this situation, if the aforementioned mode setting command requests the interface bridge circuit 100 to adopt the speed as priority approach as its operation strategy, then the control circuit 140 may select a candidate operation mode having the highest nominal data rate from multiple candidate operation modes matching the conditions to be the second target operation mode.

If the aforementioned mode setting command requests the interface bridge circuit 100 to adopt the balanced approach as its operation preference, then the control circuit 140 may select a candidate operation mode from multiple operation modes matching the conditions to be the second target operation mode, such that the difference between the nominal data rate of the second target operation mode and the nominal data rate of the first target operation mode can be minimized.

If the aforementioned mode setting command requests the interface bridge circuit 100 to adopt the power saving approach as its operation strategy, then the control circuit 140 may select a candidate operation mode having the lowest nominal data rate from multiple candidate operation modes matching the conditions to be the second target operation mode.

As can be appreciated from the foregoing descriptions, through the configuration of the command interface 310, the interface bridge circuit 100 is enabled to allow the user to flexibly configure the selection approach adopted by the control circuit 140 when selecting the aforementioned first target operation mode or second target operation mode. Such structure is beneficial to improve the utilization flexibility of the interface bridge circuit 100, and also allows the user to change the operation mode of the interface bridge circuit 100 based on the user's requirement.

The foregoing descriptions regarding the connections, implementations, operations, and related advantages of other components in FIG. 1 are also applicable to the embodiments of FIG. 3. For the sake of brevity, those descriptions will not be repeated here.

As can be appreciated from the foregoing descriptions, by purposely instructing the first interface circuit 110 and the second interface circuit 120 to respectively operate in the first target operation mode and the second target operation mode having similar nominal data rates with each other, the control circuit 140 can avoid the first interface circuit 110 or the second interface circuit 120 from wasting meaningless resources on operating in the operation mode with the maximum data rate.

In addition, the disclosed approach of controlling the first interface circuit 110 and the second interface circuit 120 conducted by the control circuit 140 can effectively reduce the heat generation of the first interface circuit 110 or the second interface circuit 120, and can decrease the possibility of that the internal components of the first interface circuit 110 or the second interface circuit 120 are damaged by suffering the thermal stress. Accordingly, the possibility of that the first interface circuit 110 or the second interface circuit 120 get damaged can be lowered, or the durability of the first interface circuit 110 or the second interface circuit 120 can be extended.

As a result, it not only extends the durability of the interface bridge circuit 100, but also decrease the power consumption of the interface bridge circuit 100. Therefore, in the situation where the first device 102 and the second device 104 are battery-powered, the aforementioned controlling approach with respect to the first interface circuit 110 and the second interface circuit 120 conducted by the control circuit 140 can also extend the operating time or the standby time of both the first device 102 and the second device 104.

Certain terms are used throughout the description and the claims to refer to particular components. One skilled in the art appreciates that a component may be referred to as different names. This disclosure does not intend to distinguish between components that differ in name but not in function. The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may include any and all combinations of one or more of the associated listed items. In addition, the singular forms "a," "an," and "the" herein are intended to include the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A circuit comprising:
    a first interface circuit configured to operably communicate with a first device by adopting a first data transmission protocol and configured to operably support multiple first interface operation modes respectively corresponding to different versions of the first data transmission protocol;
    a second interface circuit configured to operably communicate with a second device by adopting a second data transmission protocol different from the first data transmission protocol and configured to operably support multiple second interface operation modes respectively corresponding to different versions of the second data transmission protocol;
    a control circuit that is coupled with the first interface circuit and the second interface circuit, that is configured to operably instruct the first interface circuit to operate in a first target operation mode selected from the multiple first interface operation modes when a predetermined condition is satisfied, and that is configured to operably instruct the second interface circuit to operate in a second target operation mode selected from the multiple second interface operation modes when the predetermined condition is satisfied, wherein the predetermined condition comprises a difference between a highest data rate supported by the first device and a highest data rate supported by the second device is greater than the predetermined threshold, and
    a data buffer circuit coupled between the first interface circuit and the second interface circuit, and configured to operably store data to be converted into different format between the first interface circuit and the second interface circuit;
    wherein a difference between a nominal data rate of the first target operation mode and a nominal data rate of the second target operation mode is less than a predetermined threshold.

2. The circuit of claim 1, wherein the multiple first interface operation modes further comprise a first candidate operation mode, and the nominal data rate of the first target operation mode is lower than a nominal data rate of the first candidate operation mode;
    wherein the predetermined condition further comprises:
        the highest data rate supported by the first device is lower than the nominal data rate of the first target operation mode.

3. The circuit of claim 2, wherein the control circuit is configured to purposely select the first target operation mode whose nominal data rate is lower than the nominal data rate of the first candidate operation mode out of the multiple first interface operation modes to be an operation mode of the first interface circuit, so as to reduce a heat generation of the first interface circuit, thereby increasing a circuit durability of the first interface circuit.

4. The circuit of claim 2, wherein the multiple second interface operation modes further comprise a second candidate operation mode, and the nominal data rate of the second target operation mode is lower than a nominal data rate of the second candidate operation mode;
    wherein the predetermined condition further comprises:
        the highest data rate supported by the second device is lower than the nominal data rate of the second target operation mode.

5. The circuit of claim 4, wherein the control circuit is configured to purposely select the second target operation mode whose nominal data rate is lower than the nominal data rate of the second candidate operation mode out of the multiple second interface operation modes to be an operation mode of the second interface circuit, so as to reduce a heat generation of the second interface circuit, thereby increasing a circuit durability of the second interface circuit.

6. The circuit of claim 1, further comprising:
    a storage circuit, coupled with the control circuit, and configured to operably store an operation-mode table, wherein the operation-mode table is recorded with mapping relationships between the multiple first interface operation modes and the multiple second interface operation modes;
    wherein the control circuit is further configured to operably select the first target operation mode from the multiple first interface operation modes and also to operably select the second target operation mode from the multiple second interface operation modes according to contents of the operation-mode table.

7. The circuit of claim 1, further comprising:
a command interface, coupled with the control circuit, and utilized for coupling with a user interface device;
wherein the predetermined condition comprises:
one or more setting commands transmitted from the user interface device are received by the command interface;
wherein the multiple first interface operation modes further comprise a first candidate operation mode, and the nominal data rate of the first target operation mode is lower than a nominal data rate of the first candidate operation mode;
the control circuit is configured to purposely select the first target operation mode whose nominal data rate is lower than the nominal data rate of the first candidate operation mode out of the multiple first interface operation modes to be an operation mode of the first interface circuit according to the one or more setting commands, so as to reduce a heat generation of the first interface circuit, thereby increasing a circuit durability of the first interface circuit.

8. The circuit of claim 7, further comprising:
a data buffer circuit, coupled between the first interface circuit and the second interface circuit, and configured to operably store data to be converted into different format between the first interface circuit and the second interface circuit.

* * * * *